July 1, 1958     W. B. FORD     2,840,910
METHOD AND MEANS TO RECORD A FUNCTIONAL DENTAL PLANE
Filed Jan. 11, 1954
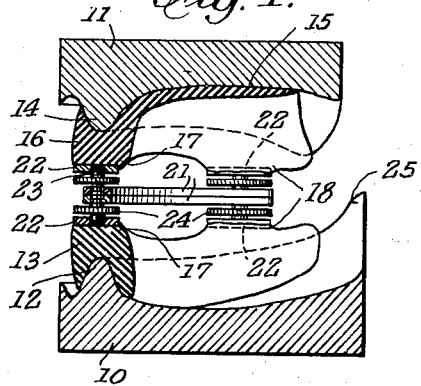
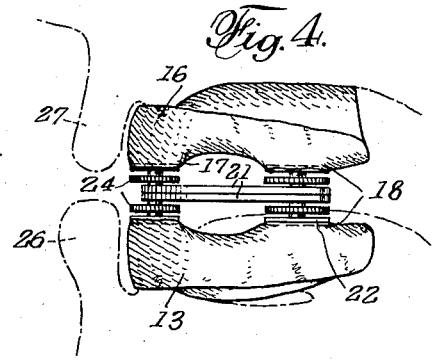
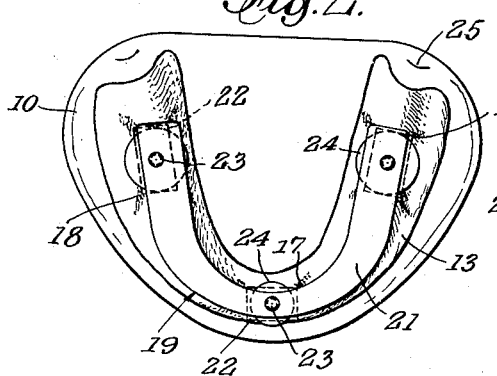
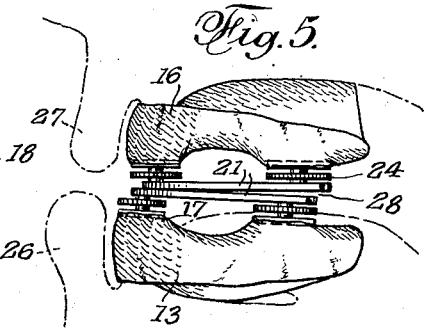
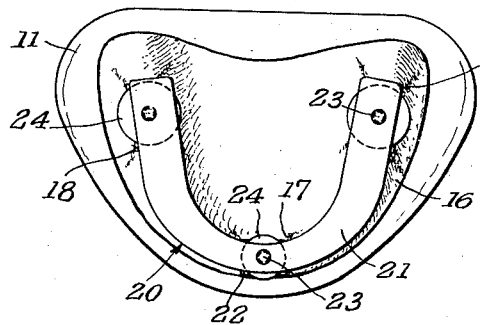
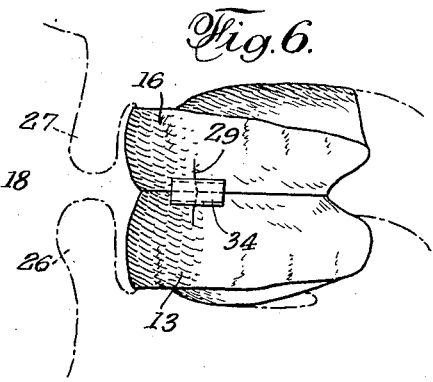
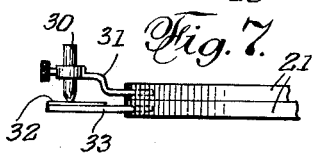
Inventor
WAYNE B. FORD
By C. T. Stratton
Attorney

United States Patent Office 2,840,910
Patented July 1, 1958

2,840,910

METHOD AND MEANS TO RECORD A FUNCTIONAL DENTAL PLANE

Wayne B. Ford, Burbank, Calif.

Application January 11, 1954, Serial No. 403,179

7 Claims. (Cl. 32—19)

This invention relates to the field of dentistry and deals more particularly with an improved method and means that enables the construction of a properly fitted set of dental plates.

Actually, there is but one plane on which the surfaces of the upper and lower teeth will properly meet in concentric occlusion and also with the lower jaw in protrusion. The tempero-mandibular joint influences the position of this plane, which is different for each individual mouth.

Full function of a denture cannot be obtained, therefore, without first establishing a correct functional plane and using the same to locate the occlusal faces of the denture teeth, and it is an object of this invention to provide a novel method and means establishing such plane.

Prior techniques sought to establish the occlusal plane with the condyles resting firmly in the glenoid fossae of the mandibular joint. Such centric occlusion is insufficient to properly establish such plane because eccentric excursions are necessary when chewing, and such excursions describe a condylar path that may be in a plane different from an initially selected plane of centric occlusion.

Therefore, another object of the invention is to provide a method and means to adjust or correct a selected functional plane, first established in centric occlusion, to a position that is correct for both centric and eccentric occlusion.

A further object of the invention is to provide means that may be placed in the mouth of a patient and adjusted in both centric and eccentric occlusion throughout the entire plane of occlusion to seek out the one proper plane that provides equal pressures on all the occlusal faces of denture teeth that are located on said plane and also provides equal pressure of the denture base on the underlying soft tissue. As a consequence of such accurate determination of the plane of occlusion, artificial dentures will so firmly be set in the mouth that anterior or later tipping is reduced in a large measure.

A still further object of the invention is to provide means to trace and, thereby, record the path of excursion of the lower jaw relative to the upper jaw during establishment of the functional plane.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a cross-sectional view of a set of clay or stone models made to reproduce the formations in a mouth relative to which formations a functional plane is to be established, said view showing means according to the present invention installed on said models.

Fig. 2 is a top plan view of the lower model and means thereon.

Fig. 3 is a bottom plan view of the upper model and means thereon.

Fig. 4 is a side view of said means as installed in the mouth from which the models were made, and in normal centric relationship.

Fig. 5 is a similar view showing the lower jaw in protrusion and the means shifted accordingly.

Fig. 6 is a similar view of said means after the hereinafter adjustments have been made to the mentioned means to establish the proper functional plane.

Fig. 7 is an enlarged fragmentary side view showing means to trace the condylar path and employed as an aid to the mentioned plane-establishing means.

In practicing the present novel method to establish a functional plane which is used as the plane on which to place the occlusal surfaces of the teeth of dentures, an impression of the mouth is made in the usual way and respectively lower and upper stone models 10 and 11 are produced from such impression, also in a well-known manner.

The ridge 12 of the lower model, representing the lower gum area, is covered with wax 13. Also, the ridge 14 and palate 15 of the upper model is similarly covered with wax 16. The wax is adapted to the models to cover the areas that are to be included in the denture that is to be produced. These waxes 13 and 16 may be reinforced with wires to give them additional strength.

In the formation of the waxes, built-up or post portions 17, at the front, and 18, at the back on both sides, are added to the waxes either to the measurement, less 2 mm., of an old denture, if available, or to an arbitrary height of 2 mm. above the gum ridges at the front in most instances.

An adjustable bite plate means 19 is sealed to the posts 17 and 18 of the lower wax 13. A similar bite plate means 20 is sealed to the posts 17 and 18 of the upper wax 16.

The bite plate means 19 and 20 are alike and, therefore, may be interchangeably used. Each such means comprises a U-shaped plate 21, a threaded block 22 at the base or front thereof and connected to said plate by a screw 23 that is provided with a peripherally-knurled knob 24. Manipulation of said knob effects adjustment of the plate 21 and block 22, relatively. The above-described jack or adjusting means is also provided at the end of each leg of the U-shaped plate.

When mounting the means 19 and 20 on the respective waxes 13 and 16, the posts 17 and 18 are placed so that blocks 22 are supported thereon and at least partly covered with wax to effect sealing as above indicated. By placing the top plane of plate 21 of means 19 in line with the height of the retromolar pad 25 of the lower model 10, while the forward edge of said plate is at an overall height of about 10 mm. with respect to the top of ridge 12, a workable position for said plate is achieved.

After the bite plate means 19 is mounted in the above preliminary manner, the lower plate-mounted wax 13 is removed from the model 10 and placed in the mouth from which said model was produced. The height of plate 21 is observed with respect to its relationship to the lower lip 26, when relaxed. The same may be adjusted, either up or down, to a desired position within the knowledge of those skilled in this art. The front jack adjusting means is used for this purpose.

Now, to check the horizontal disposition of lower plate 21, a flat spatula is placed upon the upper face of one leg of said plate. With the patient in erect position and looking straight ahead, and the spatula extending forwardly outward, while the doctor introduces his fingers or other object between said spatula and the upper gums to supply a height comparable to upper teeth, the disposition of the spatula may be observed. If the same is horizontal in the direction of its length, plate 19 is demonstrated to be horizontal front to back. If not, said plate is adjusted and it is preferred that the adjustment be at the back or posterior so as not to disturb the front or anterior which had been adjusted to the relaxed lip line.

The above step is repeated except that the spatula is placed transversely so as to extend laterally to check the horizontal disposition of plate 21 side to side. If adjustment is indicated, one or the other of the adjusting means at the back may be manipulated to produce a level and side-to-side horizontal position of plate 21. After this has been done, the front-to-back disposition of plate 21 may be re-checked as above.

When it is found that the bottom plate 21 is horizontal, both front-to-back and transversely, the upper wax 16, after removal from model 11, is placed in the mouth. This wax is not yet provided with the means 20 at this time, but has only the anterior post 17 and posterior posts 18 provided thereon. The height of the anterior post 17 is first checked with respect to the upper lip 27, when relaxed. In order that the anterior teeth of the ultimate denture be of proper length, said post 17 should extend to the lip line. If said post is longer or shorter, the height thereof is adjusted accordingly.

Now, the means 20 may be sealed to the wax 16 in substantially the same way that means 19 was sealed to wax 13. While plate 21 of the means 20 is shown with a front adjustment, if the space between the bottom plate and the anterior post 17 of the top wax is so small as not to accommodate the adjusting means, the upper bite plate may be made without such adjusting means at the front and the same used only where there is lack of space. If room allows use of the front-adjustable plate, the block 22 thereof is first fully extended before the same is sealed to the end of the wax post.

Now, the correct anterior opening is established by causing the patient to produce certain sibilant and other sounds. The same will establish or record the position of the jaws which should be spaced 2 or 3 mm. when the sibilant sounds are made.

At this time, the upper bite plate is adjusted by means of its posterior adjusting means to lie in flat contact with the lower plate. All of the foregoing adjustments are made with the jaws in centric relationship. A temporary functional plane that is proper only for such centric engagement has thus been established at the contacting faces of plates 21.

At this time, the patient is asked to protrude the lower jaw to incisal position. When this is done, a space usually occurs between the posterior portions of plates 21 because of the influence of the tempero-mandibular joint, since the condyle of said joint moves down over the articular eminence thereof during jaw protrusion. Such a space is shown at 28 in Fig. 5.

Now, the procedure is to adjust the back of the lower bite plate upwardly, while jaw protrusion is maintained, until flatwise contact of the two bite plates is re-established. When the lower jaw is retracted to normal position, a space will be noted between the front portions of the bite plates. To bring the bite plates back to flatwise contact, the rear portion of the upper plate is adjusted upwardly. The above is repeated, if subsequent jaw protrusion produces a space between the bite plates at the back. Thus, it will be seen that, with the jaw in protrusion, the posterior of the lower bite plate is adjusted upwardly and, with the jaw retracted to normal position, the posterior of the upper bite plate is also adjusted upwardly. The anterior of the plates remains where initially placed.

When the two plates maintain flatwise engagement, both when the jaws are in centric and the lower jaw protruded, the proper functional plane has been found.

Now, the spaces between posts 17 and 18 are filled in with wax to make a continuous and smooth wall on both the inside and outside of each wax 13 and 16. This condition is shown in Fig. 6 and produces in the mouth a mass of material that is comparable to the mass of a set of dental plates including the teeth thereof. Since the contacting faces of the bite plates 21 are representative of the occlusal faces of the teeth of such dental plates, the patient will have resident in the mouth a replica of all of the dental plates to be produced therefrom.

After the temporal muscles have been checked in centric and a check made to insure equal pressure on both sides, matching check lines 29 are scribed in the two waxes.

As an aid to establishing accurate centricity of the two waxes, the means shown in Fig. 7 may be employed. The same comprises a stylus 30, carried by a removable bracket 31, from the anterior edge of the upper bite plate 21, and a scribe plate 32, carried by a removable bracket 33 from the anterior edge of the lower plate. By causing the stylus to trace a so-called "Gothic arch" on plate 32 by gyrating or by protrusions and lateral excursion of the lower jaw with the bite plates 21 in engagement, an accurate determination of centricity of jaws is obtained. At this time, a line may be scribed in the upper wax to mark the center of the face.

Now, wax is used to seal the two waxes together or, as shown, one or more staples 34 used as a clip to secure the waxes against accidental displacement.

The waxes are now removed from the mouth and replaced on the stone models 10 and 11. The models are then placed in an articulator of conventional form and the same secured in place. Also, the two bite plates 21 are secured in their positions relative to the models and as adjusted by the method steps above outlined. With the models and bite plates now held in proper relationship, the waxes 13 and 16 may be removed, in whole or in part, and modeled as desired. Since plates 21 establish the functional plane, the sets of teeth that are now mounted in the waxes are set to this plane which, therefore, is the occlusal plane of said teeth.

Thereafter, the procedure is conventional to produce acrylic dentures or the like. However, the teeth of such dentures, being on the functional plane established as herein described, meet on their proper occlusal plane. The resultant denture normally will not tip or wobble in the mouth and will remain firmly in place under all conditions of excursion of one denture relative to the other if there is no cuspal interference.

While I have illustrated and described what I now contemplate to be the best mode of carrying out my invention, the construction is, of course, subject to modification without departing from the spirit and scope of the invention. It is, therefore, not desired to restrict the invention to the patricular form of construction illustrated and described, but to cover all modifications that may fall within the scope of the appended claims.

Having thus described the invention, what I claim and desire to be secured by Letters Patent is:

1. Means to establish a functional plane between upper and lower waxes formed on models of the upper and lower mouth areas and disposed on said mouth areas, said means comprising two similar U-shaped bite plates generally conforming to the shape of the gum ridges of said mouth areas, members associated with said plates and adapted to be embedded in said waxes, and jack means interconnecting each said plate and the respective associated members to adjust each plate relative to the wax on which mounted.

2. Means according to claim 1: said jack means being provided at least at each posterior end of each said U-shaped bite plate.

3. Means according to claim 1: said jack means being provided at the center of the anterior portion of each U-shaped bite plate and at the ends of the legs of said plate in the posterior position thereof.

4. An adjustable bite plate comprising a flat U-shaped member, and a jack at the end of each leg of said member to adjust the same relative to an oral wax impression on which mounted.

5. An adjustable bite plate comprising a flat U-shaped member, a jack at the end of each leg of said member to adjust the same relative to an oral wax impression on which mounted, and a similar jack at the middle of the portion of said plate that connects said legs.

6. A method for establishing a functional dental plane to be subsequently used as the occlusal plane relative to which the teeth of artificial dentures are to be placed, said method consisting in first establishing a flat lower member on a preliminary horizontal plane, mounting from the upper jaw a similar and upper member in flat contact with the lower flat member, and then, during alternate protrusions and retractions of the lower jaw, adjusting the posteriors of said members relatively to each other and to the jaws to bring the same into flatwise engagement in all excursions of one jaw relative to the other.

7. The method according to claim 6: carrying said upper and lower members on waxes fitted to the gum ridge portions of the respective upper and lower mouth areas, and connecting said wax during centric relationship of the jaws preliminary to removal thereof from the mouth.

References Cited in the file of this patent

UNITED STATES PATENTS

| | | |
|---|---|---|
| 2,418,648 | Kile | Apr. 8, 1947 |
| 2,507,118 | Opotow | May 9, 1950 |
| 2,562,106 | Leathers | July 24, 1951 |
| 2,612,688 | Avary | Oct. 7, 1952 |